United States Patent Office 3,814,825
Patented June 4, 1974

3,814,825
PROCESS OF PRODUCING A CHUNKED CHEESE-FLAVORED PRODUCT
Earl J. Gilmartin, Jr., 1108 E. Plateau Road, Spokane, Wash. 99203; Alfred E. Allen, Jr., 16003 Inglewood Road, Bothell, Wash. 98011; and Donald R. Meeder, 2721 Alameda, San Mateo, Calif. 94403
No Drawing. Filed Mar. 12, 1971, Ser. No. 123,892
Int. Cl. A23c 19/12
U.S. Cl. 426—361          10 Claims

ABSTRACT OF THE DISCLOSURE

A chunked synthetic cheese-flavored product suitable for use as any true cheese in salad dressings, dips, dehydrated foods, sauces, etc., is produced by admixing a finely comminuted cheese-flavored dry material into a molten blend of hard and soft fats and by cooling and chunking the admixture into discrete chunks.

---

This invention relates to process for producing cheese-flavored compositions. More particularly, this invention relates to processes for producing a chunked synthetic cheese product and to the product so produced.

Synthetic and true cheese materials have been produced for use in the manufacture and remanufacture of liquid salad dressings, party or snack dips, dehydrated food products, and like foods. By and large, all such cheese materials have required either dehydration or refrigeration to prevent deterioration under normal shipping and shelf storage conditions. Furthermore, those cheese materials that do not require refrigeration are provided in chip, flake or powder form and, while satisfactory for use with some food products, they do not enhance the appearance and flavor of the end food product to the extent that chunks of true cheese would.

It is, therefore, a primary object of this invention to provide a process for producing a synthetic cheese product in chunked form that does not require dehydration or refrigeration and that closely resembles in texture, color and flavor, chunks of true cheese. A further object is to provide such a chunked synthetic cheese product that is both oil stable and water stable under normal shelf storage conditions and that is sufficiently resistant to crumbling to withstand shipment in bulk under normal conditions. These and other objects and advantages will be apparent from the following description.

In brief, the process of the present invention comprises providing a heated, molten body of edible fat, admixing thereinto a finely comminuted cheese-flavored dry material, cooling the admixture to a temperature below about 90° F. Chunking the cooled admixture, and then dusting the product coming out of the machine to prevent coagulating together and leaving individual chunks.

The fat is a blend of soft and hard fats, the soft fat being characterized by a melting point between about 90° F. and 140° F. and a softening point at about 75° F.–115° F., and a hard fat being characterized by a melting point between about 115° F. and 140° F. and a softening point between about 110° F.–120° F. The ratio of the soft fat to hard fat will vary depending on the desired firmness of the final product and the fat content of the dry materials particularly the dry powdered true cheese flavoring. For example true cream cheese flavoring has a substantially higher fat content than true bleu cheese flavoring.

The total fat content of the resultant chunked product must be within a range of 35–95 wt. percent of the dry material. The amount of fat relative to the amount of dry material, on a weight basis, is dependent on the fat content and fat absorption characteristics of the dry material. Thus, if the dry material is substantially entirely composed of dehydrated pure cheese material, the added fat may constitute 35–60 wt. percent of the dry material. If the dry material is substantially composed of 50% dehydrated pure cheese material and 50% other fillers, that is, dry ingredients other than true cheese flavoring, the added fat may constitute 50–75 wt. percent of the dry material. If the dry material is substantially entirely composed of filler that is even the true cheese flavoring is replaced by a synthetic, the added fat may constitute 64–95 wt. percent of the dry material. A total fat content greater than 95 wt. percent will cause the resultant chunked product to be too greasy and unpalatable. A total fat content less than approximately 35 wt. percent will prevent a cooled admixture from being chunked and the resultant product will be granular. Another factor affecting the fat content is the moisture content of the dry materials. A generally accepted maximum limit of moisture content to prevent spoilage is approximately 10%. A moisture content variance within this range however will affect the firmness of the final product and must be considered in determining the total fat content.

When the dry material constitutes dehydrated spray dried cheese powder, the added fat preferably amounts to about 60 wt. percent of the dry material. When the dry material constitutes 40 wt. percent dehydrated spray dried cheese powder and 50 wt. percent hydrolyzed cereal solids the added fat preferably amounts to about 62 wt. percent of the dry material. When the dry material constitutes hydrolyzed cereal solids, the added fat preferably amounts to about 65 wt. percent of the dry material.

The finely comminuted, cheese-flavored, dry material may be any one or a combination of low moisture-containing bulk materials such as pasteurized and dehydrated cheese, pasteurized milk solids, hydrolyzed cereal solids or sugar derivatives such as lactose, dextrose and maltose. Of the commercially available dehydrated cheese materials, those produced by spray-drying are most desirable. Spray-dried cheese material may include milk solids from milk added to the cheese slurry before pasteurization and spray drying. As mentioned above, the moisture content of the dry material should be less than 10%.

Along with dry materials that do not include cheese, either true or artificial cheese flavors would be required in an amount suitable to impart the desired taste. Such flavors may also be desirably added when dehydrated cheese constitutes all or a portion of the dry material. Typical examples of suitable commercially available true or artificial flavors include bleu cheese, bleu and Cheddar cheese, Cheddar cheese, cream cheese, Swiss cheese, Roquefort cheese, Cheddar cheese and bacon, cream cheese and ham, and so forth. As examples of flavor material proportions: in a typical chunked product wherein the dry material is constituted of substantially 100% true dehydrated cheese, imitation flavor material may be added in the amount of 0.5 wt. percent of the dry material; or wherein the dry material is constituted of 50% true dehydrated cheese, flavor material may be added in the amount of 1.0 wt. percent of the dry material, or wherein the dry material is constituted of substantially 100% material including no true cheese, flavor material may be added in the amount of 3.5 wt. percent of the dry material. Flavor materials that are not hydroscopic should be employed.

In addition to flavor materials, such commercially available materials as anti-oxidants, yeast and mold inhibitors, artificial coloring and moisture inhibitors may be beneficially added. Anti-oxidants and yeast and mold inhibitors may be added in amounts ranging from 0.001–2.2 wt. percent of the total weight of the admixture depending upon the type of additive. Preferred anti-oxidants include, for example, butylated hydroxyanisole and butylated hydroxytoluene. A preferred yeast and mold inhibitor is, for example, potassium sorbate. A preferred anticaking moisture inhibitor is, for example, calcium stearate.

Examples of preferred formulations are as follows:

BLEU CHEESE 100.00 lbs. Blended Bleu Cheese powder
38.50 lbs. Kopald Shortening (hydrogenated soft fat)
35.50 lbs. Co Co T Shortening (hydrogenated hard fat)
4.00 lbs. monosodium glutamate
2.00 lbs. salt
2.00 lbs. Morex (hydrolyzed cereal solid)
1.00 lb. Polaks Imitation Bleu Cheese Flavor 3X1001 (synthetic flavoring)
Quantity of Morex for dusting not to exceed 2% by weight of total product
Add Tenox (anti-oxidant to prevent rancidity) either #4 or #1 but not to exceed ½ of 1% by weight of fat content and this includes oil carrier
Add potassium sorbate (yeast and mold inhibitor) not to exceed .05% by weight
Blend at 3500 r.p.m. for 6 minutes. The temperature should be approximately 98° F.

CHEDDAR CHEESE 40.00 lbs. B D Cheddar Cheese
15.00 lbs. Kopald Shortening
10.50 lbs. Co Co T Shortening
.50 lb. Morex
.38 lb. Polaks Imitation Cheddar Flavor Cheese Flavo lok 65001
Quantity of Morex for dusting not to exceed 2% by weight of total product
Add Tenox either #4 or #1 but not to exceed ½ of 1% by weight of fat content and this includes the oil carrier or approximately 4.5 grams per this batch, but this should be calculated at the time of manufacturing due to variables that may occur.
Add potassium sorbate not to exceed .05% by weight
Blend at 3500 r.p.m. for 6 minutes. The temperature should be approximately 98° F.

CREAM CHEESE 50.00 lbs. cream cheese powder
22.00 lbs. hard fat
21.00 lbs. soft fat
0.50 lb. imitation flavor
0.08 lb. potassium sorbate (yeast and mold inhibitor)
0.04 lb. Tenox
Quantity of Morex for dusting not to exceed 2% by weight
Blend at 3500 r.p.m. for 6 minutes. The temperature should be approximately 98° F.

The solidified admixture may be chunked, for example, by dicing or cubing with a guillotine type (chopping) cutter after the dough admixture has been rolled out to desired thickness with a dough roller, or cutting into lengths after extrusion to the desired thickness. Another technique includes extruding and cutting and is disclosed in copending U.S. patent application, Ser. No. 52,898, filed July 7, 1970, now abandoned. Chunking should be effected at a temperature between about 60° F. and 90° F. Above a temperature of about 90° F., the admixture will not be sufficiently solid to permit complete severance into discrete chunks. Below a temperature of about 60° F., the admixture will be too brittle to prevent shattering into smaller than desired chunks.

The chunked product is then dusted preferably with a hydrolyzed cereal solid to prevent coagulation of the chunks.

The chunked product may be cold tempered, if desired, by passage through a chilling tunnel or by other suitable refrigeration means. Cold tempering should be conducted for a period sufficient to enable the chunked product to totally congeal; that is, for the product to reach a uniform temperature at or below normal ambient room temperatures.

The product produced by the method of this invention is a non-polar solid. Thus, it will not dissolve or disintegrate in such polar liquids as water. It will not dissolve in such non-polar liquids as salad oil because it remains solid at normal storage and shipping temperatures and is therefore not miscible therewith.

It is believed that the invention will have been clearly understood from the foregoing detailed description of our now-preferred illustrated embodiment. Changes in the details of construction may be resorted to without departing from the spirit of the invention and it is accordingly our intention that no limitations be implied and that the hereto annexed claims be given the broadest interpretation to which the employed language fairly admits.

The embodiments of the invention in which an exclusive property or privilege is claimed are defined as follows:

1. A process for producing a chunked cheese flavored composition which comprises the steps of admixing a molten blend of hard and soft fats with a finely comminuted cheese flavored dry material in sufficient amount that the total fat content of the admixture is between about 40 and 95 wt. percent of the cheese-flavored dry material; cooling the admixture to a solid state; chunking the cooled admixture into discrete chunks having a consistency similar to natural cheese; and treating the chunks to prevent coagulation.

2. The process of claim 1 said treating step including dusting the chunks with powdered hydrolyzed cereal solids.

3. The process of claim 1 wherein said dry material consists of spray dried cheese material and said blend of hard and soft fats constitutes 35 to 95 wt. percent of said dry material.

4. The process of claim 1 wherein said dry material includes about 40 wt. percent of spray dried cheese material and said blend of hard and soft fats constitutes 50–75 wt. percent of said dry material.

5. The process of claim 1 wherein said dry material consists of low-fat containing material and said blend of hard and soft fats constitutes 64–95 wt. percent of said dry material.

6. The process of claim 1 wherein said soft and hard fat ratio is about 2:1 or 3:1 depending on materials used such that said discrete chunks are suitable for addition to liquid salad dressings and other food products having either a solid base oil, a water base, a vinegar base, or a combination thereof.

7. The process of claim 1 wherein said soft to hard fat ratio is about 0.7:1 such that said discrete chunks are suitable for addition to cream cheese or sour cream type dressings or dips.

8. The process of claim 1 wherein said flavored dry material is dehydrated pasteurized cheese.

9. The process of claim 1 wherein said flavored dry material is dehydrated pasteurized cheese with a filler.

10. The process of claim 1 wherein said flavored dry material is an artificially cheese flavored filler.

References Cited

UNITED STATES PATENTS

| | | | |
|---|---|---|---|
| 2,015,257 | 9/1935 | Clickner | 99—117 X |
| 2,015,258 | 9/1935 | Clickner | 99—117 X |
| 3,582,353 | 6/1971 | Fehr et al. | 99—140 R X |
| 2,279,202 | 4/1942 | Musher | 99—117 |
| 3,519,435 | 7/1970 | MacCollom | 99—118 R |
| 2,648,607 | 8/1953 | Krusi | 99—117 |
| 2,557,283 | 6/1951 | Hansen | 99—118 P X |

MORRIS O. WOLK, Primary Examiner

S. MARANTZ, Assistant Examiner

U.S. Cl. X.R.

426—188